(12) United States Patent
Matsumura et al.

(10) Patent No.: US 11,728,665 B2
(45) Date of Patent: *Aug. 15, 2023

(54) BATTERY CHARGE TERMINATION VOLTAGE ADJUSTMENT

(71) Applicant: Intel Corporation, Santa Clara, CA (US)

(72) Inventors: Naoki Matsumura, San Jose, CA (US); Simon N. Peffers, Acton, MA (US); Steven Lloyd, Santa Clara, CA (US); Michael T. Crocker, Portland, OR (US); Aaron Gorius, Upton, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/232,023

(22) Filed: Apr. 15, 2021

(65) Prior Publication Data

US 2021/0234377 A1 Jul. 29, 2021

Related U.S. Application Data

(63) Continuation of application No. 16/057,588, filed on Aug. 7, 2018, now Pat. No. 10,985,587.

(51) Int. Cl.
*H02J 7/00* (2006.01)

(52) U.S. Cl.
CPC ........ *H02J 7/0048* (2020.01); *H02J 7/00714* (2020.01)

(58) Field of Classification Search
CPC .................................. H02J 7/0047; H02J 7/007
See application file for complete search history.

(56) References Cited

U.S. PATENT DOCUMENTS

| | | | |
|---|---|---|---|
| 8,138,721 B2 | 3/2012 | Yang et al. | |
| 10,985,587 B2* | 4/2021 | Matsumura | H02J 7/007 |
| 2002/0053895 A1 | 5/2002 | Simoes et al. | |
| 2009/0108804 A1* | 4/2009 | Aradachi | H02J 7/007 |
| | | | 320/106 |
| 2011/0084662 A1 | 4/2011 | Yang et al. | |

(Continued)

FOREIGN PATENT DOCUMENTS

| | | | |
|---|---|---|---|
| KR | 20090126099 A | 12/2009 | |
| KR | 20170116816 A | 10/2017 | |
| WO | WO-2017179827 A1 * | 10/2017 | G01R 31/36 |

OTHER PUBLICATIONS

WO-2017179827-A1 Machine Translation (Year: 2022).*

(Continued)

*Primary Examiner* — David V Henze-Gongola
(74) *Attorney, Agent, or Firm* — Schwabe, Williamson & Wyatt, P.C.

(57) ABSTRACT

In some examples, a control unit is configured to adjust charge termination voltage of a rechargeable energy storage device. The control unit is adapted to charge the rechargeable energy storage device to a charge termination voltage where the rechargeable energy storage device has capacity to support peak load but comes close to a system shutdown voltage after supporting peak load. The control unit is also adapted to increase the charge termination voltage if a voltage of the rechargeable energy storage device is near a system shutdown voltage after supporting peak load.

20 Claims, 7 Drawing Sheets

(56) References Cited

U.S. PATENT DOCUMENTS

| | | |
|---|---|---|
| 2012/0086368 A1 | 4/2012 | Kawabuchi et al. |
| 2013/0049702 A1 | 2/2013 | Dai et al. |
| 2013/0207591 A1 | 8/2013 | Reineccius |
| 2016/0020618 A1* | 1/2016 | Yang .................. H02J 7/04 320/162 |
| 2016/0064961 A1 | 3/2016 | Dicarlo et al. |
| 2017/0117721 A1 | 4/2017 | Toya |
| 2017/0120773 A1 | 5/2017 | Zhang et al. |
| 2019/0305574 A1 | 10/2019 | Matsumura et al. |
| 2022/0140631 A1 | 5/2022 | Fukushima |

OTHER PUBLICATIONS

International Search Report for Related PCT Application No. PCT/US2020/024481 dated Jul. 8, 2020, 3 pages.

International Search Report & Written Opinion dated Jul. 8, 2020 for PCT Patent Application No. PCT/US2020/024481.

Non-Final Office Action dated Jun. 3, 2021 for U.S. Appl. No. 16/444,623, 18 pages.

Final Office Action dated Dec. 9, 2021 for U.S. Appl. No. 16/444,623, 21 pages.

International Preliminary Report on Patentability dated Dec. 30, 2021 for PCT Patent Application No. PCT/US2020/024481, 8 pages.

Final Office Action from U.S. Appl. No. 16/057,588 dated Oct. 13, 2020, 16 pgs.

Non-Final Office Action from U.S. Appl. No. 16/057,588 dated Mar. 6, 2020, 13 pgs.

Notice of Allowance from U.S. Appl. No. 16/057,588 dated Dec. 22, 2020, 8 pgs.

Non-Final Office Action dated Aug. 4, 2022 for U.S. Appl. No. 16/444,623, 24 pages.

Non-Final Office Action dated Mar. 31, 2023 for U.S. Appl. No. 16/444,623, 22 pages.

* cited by examiner

US 11,728,665 B2

BATTERY CHARGE TERMINATION VOLTAGE ADJUSTMENT

CLAIM OF PRIORITY

This application is a continuation of, and claims the benefit of priority to, U.S. patent application Ser. No. 16/057,588, filed on Aug. 7, 2018 and titled "BATTERY CHARGE TERMINATION VOLTAGE ADJUSTMENT," which is incorporated by reference in entirety.

TECHNICAL FIELD

This disclosure relates generally to adjusting a battery charge termination voltage.

BACKGROUND

A stationary computing system such as a server computing system typically uses power from a power supply unit (PSU). If the stationary computing system includes an internal energy storage source such as a battery, the system can perform better by utilizing power from both the PSU and the battery under certain conditions such as when the system is under peak load. The battery can be charged to a fully charged state and used when the system needs more power than the PSU is capable of providing. At peak load, both the PSU and the battery can provide power to the system. After the battery is used to help support peak load of the system, the battery can then be fully charged so that it is ready to be used again when needed to help support peak load. However, charging the battery to a full charge (or 100% charge) each time can limit the life of the battery.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF THE EMBODIMENTS

Figure 1:
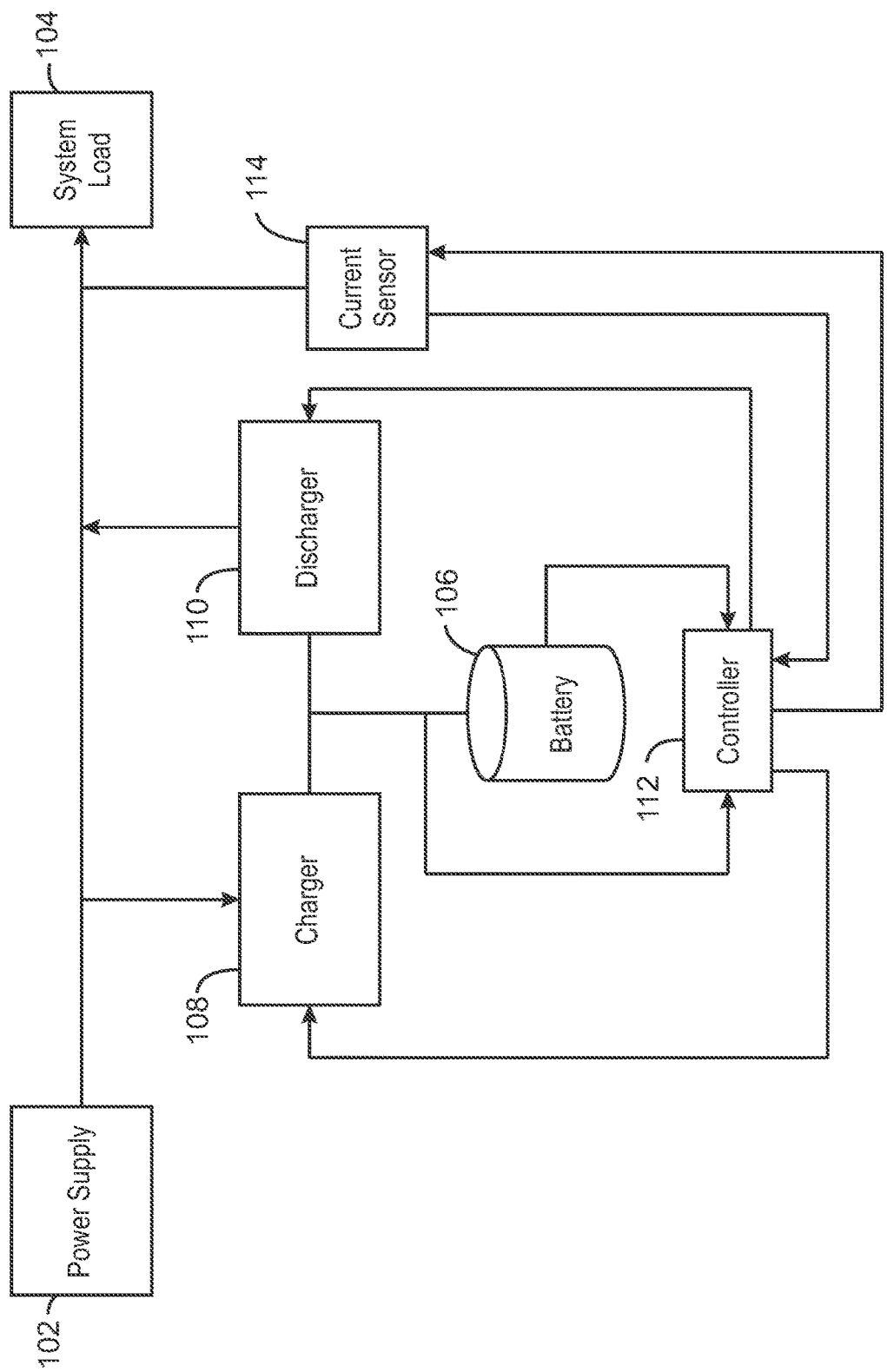
FIG. 1 illustrates a system in accordance with some embodiments.

Some embodiments relate to adjusting a battery charge termination voltage. Some embodiments relate to extending battery longevity by adjusting a battery charge termination voltage. Some embodiments relate to adjusting a battery charge termination voltage in a computer system using power from a power supply such as a power supply unit (PSU) as well as power from an internal energy storage device (for example, a rechargeable energy storage device such as, for example, a battery). In some embodiments, battery longevity and/or cycle life can be implemented by adjusting the battery charge termination voltage.

In some embodiments a computing system (for example, a stationary computing system such as a server in a data center) receives power from a power supply such as a PSU. In some embodiments, the system includes a rechargeable energy storage device. In some embodiments, the rechargeable energy storage device can be an internal energy storage device such as one or more renewable energy storage device (for example, one or more battery such as one or more lithium ion battery) to help the system perform better by utilizing power from both the power supply and the energy storage device. The battery (or energy storage device) can be charged and used during times that the system needs more power than the power supply is capable of providing (for example, during peak load times). After these times are over, the battery can then be charged so that it is ready to be used again in a similar manner during other times that the system needs more power.

In some embodiments, an energy storage device such as a battery or other rechargeable energy storage device can be set at an initial charge level that is at a point that just supports the system. This charge level can be increased throughout the life of the battery to continue to support the system in a manner that the battery voltage does not reach a system shutdown voltage, but nears the system shutdown voltage after being used (for example, after being used for peak load support).

In some embodiments, after a rechargeable energy storage device (for example, such as a battery) used in a stationary computing system is used to help supply power to the system (for example, at an end of discharge voltage), each time the remaining voltage comes close to a system shutdown voltage (for example, within a certain tolerance level), the energy storage charge termination voltage is increased by a slight amount. The charge termination voltage can be increased a slight amount as needed (for example, as battery impedance increases). The charge termination voltage can be increased slightly in this manner several times, until the charge termination voltage is close to or at a safety threshold voltage level of the energy storage device. In some embodiments, the energy storage device is charged to a high enough charge termination voltage so that, during use of the energy storage device, the voltage of the energy storage device does not hit the system shutdown voltage.

In some embodiments, in a data center and/or server implementation, for example, the total cost of ownership (TCO) can be lowered. This can be accomplished by lowering the load to the power station that delivers power (for example, by lowering the load to the power station that delivers power to the building) and/or made quiescent. In some embodiments, energy is not dumped into the grid and lost, but can be stored in energy storage devices such as batteries, which may be used during peak load, for example. When lulls in the system occur, the energy storage devices may be charged for later use (for example, during peak load). During peak load, the stored energy may be used without demanding additional power from the power station.

FIG. 1 illustrates a system 100 in accordance with some embodiments. In some embodiments, system 100 is a power supply system (for example, a stationary power supply system such as a server power supply system). In some embodiments, system 100 includes a power supply 102 (for example, in some embodiments, a power supply unit 102), a system load 104 (for example, in some embodiments, a stationary computing system load 104), a battery 106, a charger 108, a discharger 110, a controller 112, and a current sensor 114. In some embodiments, power supply 102 is a power supply unit (PSU) that can convert AC power to low-voltage regulated DC power for the internal components of a system such as a computer system. In some embodiments, battery 106 can be any one or more rechargeable energy storage device.

In some embodiments, system 100 is a hybrid power boost (HPB) charging system, and charger 108 is a HPB charger. Charger 108 can provide power to charge the battery 106. Discharger 110 can discharge battery 106 and provide power to system load 104. In some embodiments, controller 112 can be a microcontroller. In some embodiments, controller 112 can be any type of controller, and can include a processor. In some embodiments, controller 112 can be an embedded controller. In some embodiments, controller 112 is a battery controller. In some embodiments, controller 112 is one or more of a microcontroller, a processor, an application specific integrated circuit (ASIC), a digital signal processor (DSP), a field programmable gate array (FPGA), and/or a dedicated integrated circuit, etc.

In some embodiments, system load 104 is a stationary computing system, such as, for example, a server or a desktop, among others. System load 104 can include a processor, a memory, one or more communication devices, etc., as well as other computing device components that make up the rest of the platform and are powered from a power supply 102 and can also be powered by a rechargeable battery such as battery 106. In some embodiments, battery 106 can provide power to system load 104 when system load 104 is at a peak load. In some embodiments, battery 106 is a lithium-ion battery pack (and/or a lithium-ion rechargeable battery). In some embodiments, other rechargeable or non-rechargeable batteries may be used in addition to battery 106 or instead of battery 106.

In some embodiments, an energy storage (for example, such as one or more capacitor) can supplement the voltage provided by battery 106 to system load 104. For example, such an energy storage can include one or more capacitors coupled together (for example, in series). For example, in some embodiments, such an energy storage can be implemented by one or more individual capacitors coupled together in parallel or in series.

Depending on the battery configuration, resistance from the battery cells to a voltage regulator (VR) input can vary. The resistance can also change based on temperature, battery wear, and variation between components. A change from in resistance can result in a considerable difference in peak power that the system can support. Different battery configurations may be used in different embodiments. For example, in some embodiments, the system may use 2S1P (2 series 1 parallel) or 2S2P (2 series 2 parallel) battery configurations.

Controller 112 can provide a charge enable signal to enable charger 108 to charge battery 106 using power from the power supply 102 (for example, when the system load 104 is not under peak load). Controller 112 can also provide a discharge enable signal to enable discharger 110 to discharge battery 106 and provide power to system load 104 (for example, when the system load 104 is under peak load). In some embodiments, controller 112 can monitor battery 106. In some embodiments, controller 112 can use monitored conditions of battery 106 as at least partial input to making decisions such as enabling charger 108, enabling discharger 110, etc. In some embodiments, for example, controller 112 can monitor conditions such as impedance of battery 106, voltage of battery 106, and/or temperature of battery 106, etc., among others. In some embodiments, current sensor 114 can sense current applied to the system load 104. Controller 112 can provide a reference current to current sensor 114, and current sensor 114 can provide a current monitor signal to controller 112, where the current monitor signal provides an indication to controller 112 that corresponds to current applied to system load 104 (for example, in some embodiments, the current monitor signal can indicate whether the current being applied to system load 104 is higher than, equal to, or lower than the reference current value). In some embodiments, controller 112 can use monitored current applied to system load 104 (for example, as at least partial input in making decisions relating to enabling charger 108, enabling discharger 110, etc.)

In some embodiments, current sensor 114 is a device that can detect electric current in a wire (for example, in FIG. 1, can detect current in the wire leading to system load 104), and can generate a signal in response to that current (for example, can generate a current monitor signal that is provided to controller 112). In some embodiments, the signal generated by current sensor 114 can be an analog voltage or current, or can be a digital output signal (for example, a digital output signal that switches when the sensed current exceeds a certain threshold, such as a reference current threshold provided to the current sensor by the controller 112).

In some embodiments, system 100 uses power supply 102 to provide power to the system load 104. An internal energy storage device of system 100 (for example, an internal energy storage device including battery 106) can be used so that power is utilized by system load 104 using both the power supply 102 and the battery 106 under peak load conditions. For example, battery 106 can be kept in a state in which controller 112 controls charger 108 to keep battery 106 fully charged (for example, using power from the power supply 102). Then, when the system load 104 needs more power than the power supply 102 can supply, in addition to power provided from the power supply, system controller 112 controls discharger 110 to provide power from the battery 106 to the system load 104. Controller 112 can then later control charger 108 to charge battery 106 once the peak load condition no longer exists.

Figure 2:
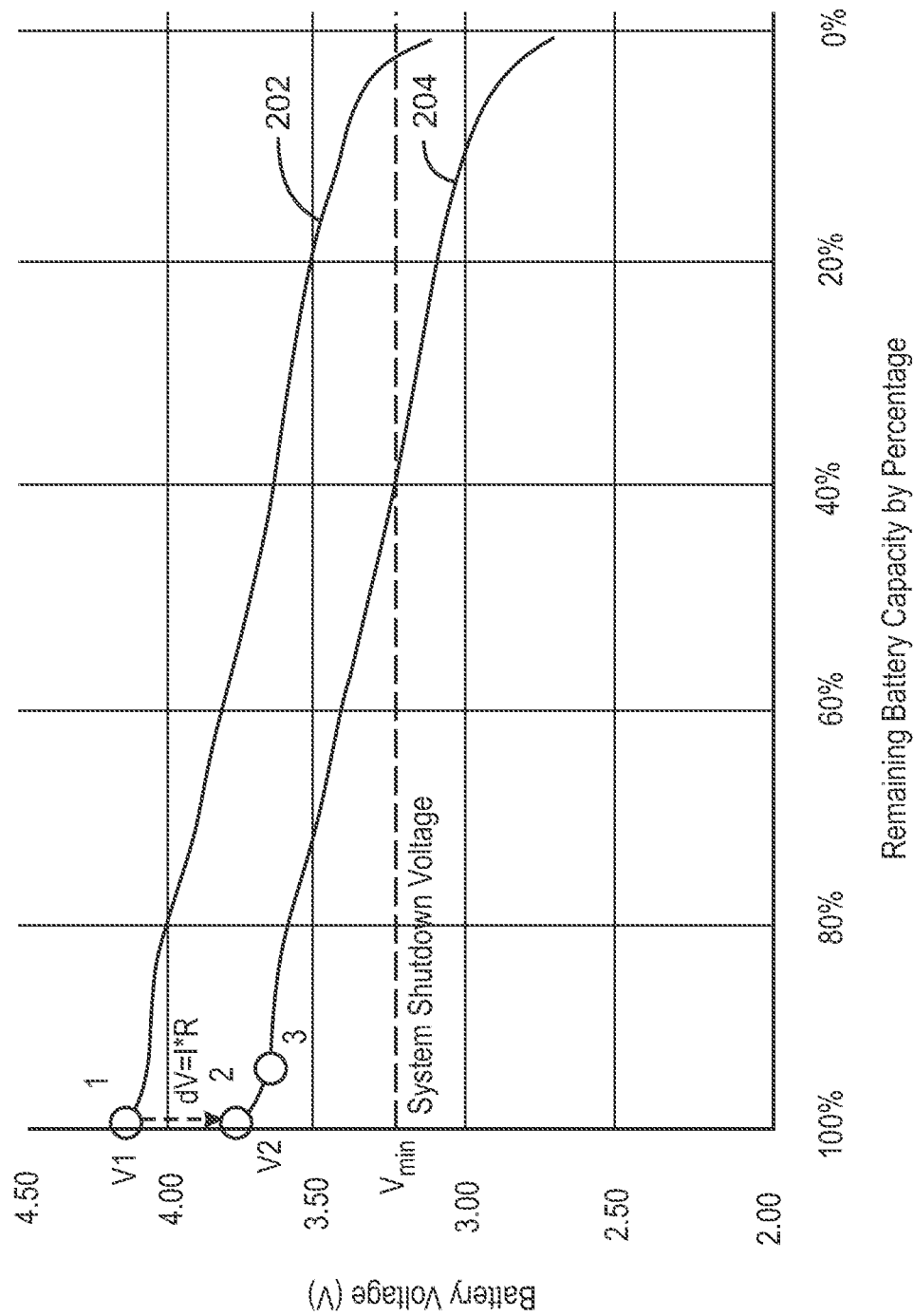
FIG. 2 illustrates a graph illustrating battery voltage and battery capacity.

FIG. 2 is a graph 200 illustrating battery voltage (V) and battery capacity (such as a remaining battery capacity by percentage). Graph 200 includes a battery open circuit voltage graph 202 and a battery voltage under load graph 204. In some embodiments, graph 200 illustrates how battery voltage changes under peak load. For example, when a battery (for example, a battery such as battery 106) is fully charged, the battery voltage may be at voltage V1 illustrated at point 1 in graph 200. When the battery is used under peak load, battery voltage changes (for example, drops) to voltage V2 at point 2, due to, for example, battery impedance. The voltage drop dV (delta V), or voltage change, from V1 to V2 can equal the current (I) times the impedance (R). That is, in some embodiments, dV=I*R. If peak load continues, battery voltage moves to the voltage at point 3. After the peak load condition ends, the battery is recharged back to voltage V1 at point 1.

Charging the battery to 100% of remaining battery capacity and then using the battery capacity during peak load conditions can be very beneficial as long as battery voltage stays above a system shutdown voltage ($V_{min}$ in FIG. 2). However, it is noted that maintaining a battery at a fully charged state (for example, at 100% of remaining battery capacity) can accelerate battery degradation and require more frequent battery replacement. This can cause disadvantageous circumstances such as, for example, increasing the cost of ownership of the system. In some embodiments, battery longevity can be extended while supporting peak load without charging the battery to a fully charged state (for example, in a stationary computing system such as a server).

In some embodiments, a charge termination voltage of the battery can be lowered to a level at which the battery has enough capacity to support peak load. After the battery ages and battery impedance increases, the charge termination voltage can be slightly increased so that the battery maintains enough capacity to support peak load. This light increase of the charge termination voltage can be implemented periodically until the battery termination voltage reaches a safety threshold.

Figure 3:
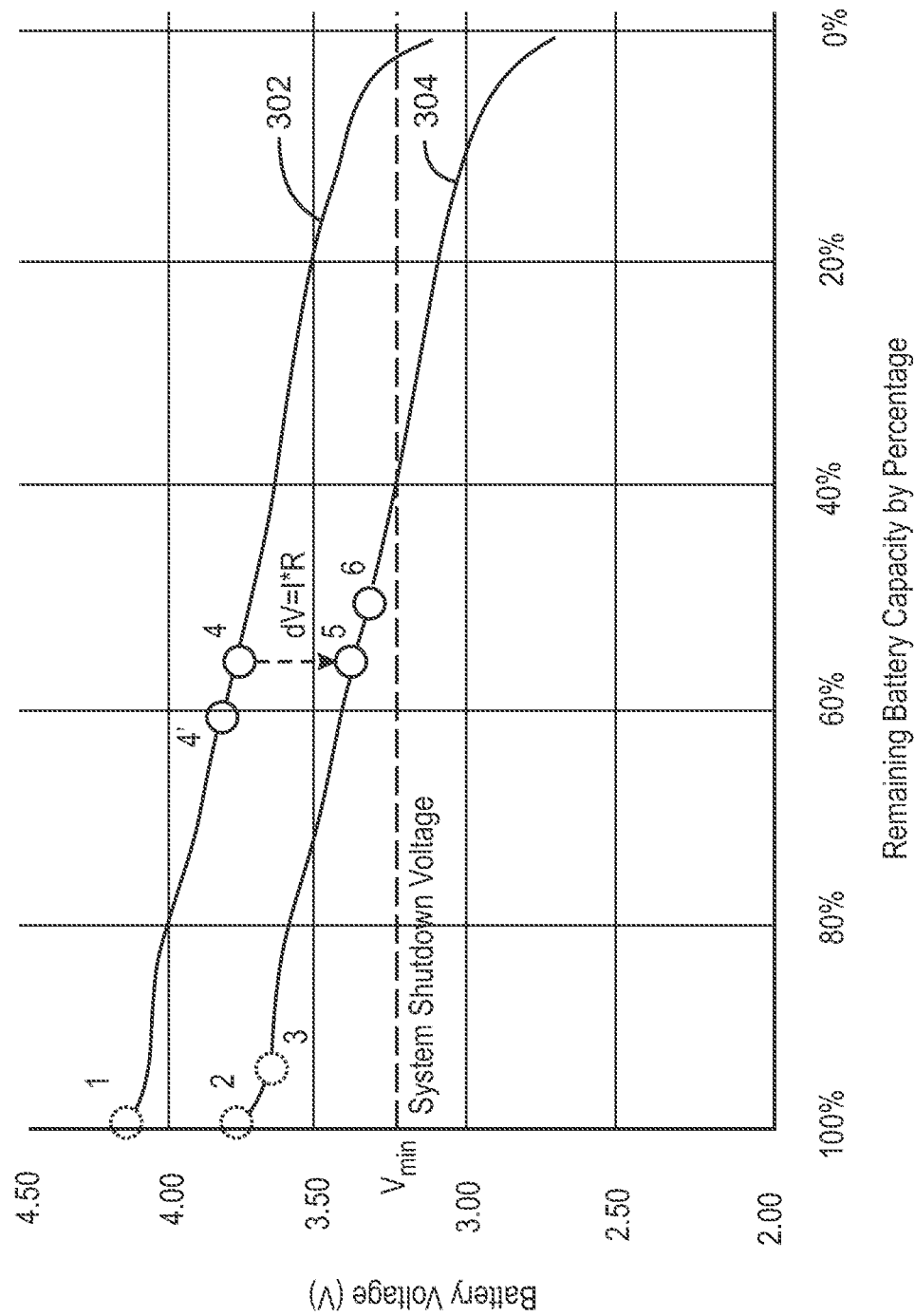
FIG. 3 illustrates a graph illustrating battery voltage and battery capacity in accordance with some embodiments.

FIG. 3 is a graph 300 illustrating battery voltage (V) and battery capacity (such as a remaining battery capacity by percentage). Graph 300 includes a battery open circuit voltage graph 302 and a battery voltage under load graph 304. In some embodiments, charge termination voltage is higher than battery open circuit voltage. During battery charge, for example, in accordance with some embodiments, battery voltage is equal to open circuit voltage plus IR (that is, plus current I times impedance R), according to $V=V_{OC}+IR$, where V is the battery voltage during battery charge, $V_{OC}$ is the open circuit voltage, I is the current, and R is the impedance.

In some embodiments, graph 300 illustrates how battery voltage changes under peak load. For example, in some embodiments, a battery (for example, a battery such as battery 106) may be charged to a lower battery charge voltage (for example, to the battery voltage where its open circuit voltage is at point 4 in FIG. 3 rather than fully charged to the voltage at point 1 in FIG. 2 or dotted point 1 in FIG. 3). When the battery is used under peak load, battery voltage changes (for example, drops) to the voltage at point 5 in FIG. 3 rather than to the voltage V2 at point 2 in FIG. 2 or dotted point 2 in FIG. 3. The change or drop from the voltage at point 4 to the voltage at point 5 is due to, for example, battery impedance. The voltage drop dV (delta V) (or voltage change) from the voltage at point 4 to the voltage at point 5 can equal the current (I) times the impedance (R). That is, in some embodiments, dV=I*R. If peak load continues, battery voltage moves to the voltage at point 6. After the peak load condition ends, the battery is recharged back to the voltage where its open circuit voltage is at point 4.

In some embodiments, point 4 is a point high enough that battery voltage after supporting peak load (that is, voltage at point 6) remains above the system shutdown voltage $V_{min}$. When the battery ages, battery internal impedance increases (for example, due to a degradation in chemistry) and the voltage change (for example, voltage drop) dV during peak load (for example, the voltage drop from point 4 to point 5 and point 6) increases. In this situation, the voltage at point 6 gets closer to system shutdown voltage $V_{min}$. Therefore, in some embodiments, the system (for example, system 100 of FIG. 1 using controller 112) can increase the charge termination voltage from the point where open circuit voltage is at point 4 to the point where open circuit voltage is at point 4' to avoid hitting the system shutdown voltage $V_{min}$ when under peak load. That is, in accordance with some embodiments, battery charge termination voltage is changed so that the corresponding open circuit voltage moves from point 4 to point 4' in FIG. 3, for example, in order to avoid battery voltage hitting system shutdown voltage after supporting peak power.

In some embodiments, as the battery ages, the system periodically repeats the increasing of the charge termination voltage from the point where open circuit voltage is 4' to various higher points on graph 302 until the battery charge termination voltage reaches a safety threshold (for example, at 100% remaining battery capacity, near 100% remaining battery capacity, and/or at or near point 1 of graph 302).

In some embodiments, for example, the voltage at point 4 in FIG. 3 may be 3.6 volts, and the voltage at point 4' in FIG. 3 corresponding to new charge termination voltage may be 3.7 volts. In some embodiments, the battery charge termination voltage may be iteratively increased by 0.1 volts each time the battery charge termination voltage needs to be increased (for example, in order to avoid hitting the system shutdown voltage $V_{min}$ when under peak load). That is, FIG. 3 could include a point 4" in FIG. 3 along battery open circuit voltage line 302 corresponding to a point where battery voltage V is 3.8 volts, a point 4''' in FIG. 3 along battery open circuit voltage line 302 corresponding to a point where battery voltage V is 3.9 volts, a point 4'''' in FIG. 3 along battery open circuit voltage line 302 corresponding to a point where battery voltage V is 4.0 volts, etc. These points 4, 4', 4", 4''', 4'''', 4''''', etc. can continue until the voltage hits the fully charged voltage level at or near point 1 (for example, in some embodiments, at or near 4.2 volts). Although a slight voltage change of 0.1 volts is used in some exemplary embodiments, it is noted that any other slight voltage change may be used in accordance with some embodiments (for example, 0.05 volts, 0.15 volts, or any other voltage increment). Additionally, in some embodiments, the slight voltage increase can be a dynamic increase rather than an increase of a set amount such as 0.1 volts.

In some embodiments, for example, the battery impedance may be considered. For example, in some embodiments, if the battery impedance increases by a certain percentage (for example, increases by 10%), an amount of additional voltage drop (voltage change) may be calculated for considering how much to increase the battery charge termination voltage. That is, in some embodiments, the battery charge termination voltage can be dynamically changed by sensing the impedance (for example, in some embodiments, using a sensor to sense the impedance and provide the sensed impedance to a controller such as controller 112 in FIG. 1 to dynamically change the termination voltage based on the sensed impedance). This impedance can be monitored using a controller or microcontroller such as controller 112 throughout the life of the battery. In some embodiments, the controller or microcontroller can increase the battery charge termination voltage a certain amount that corresponds to the sensed amount (and/or sensed percentage) of increase of the impedance. In some embodiments, the controller (for example, controller 112) can adjust the charging circuit (for example, charger 108) a dynamic amount to elevate the charge voltage of the battery (for example, battery 106) based on the amount of increase of the impedance.

In some embodiments, in charging (for example, in charging the battery from point 6 to point 4 or to point 4' in FIG. 3, or to other battery charge termination voltages, for example) constant current charging may be implemented. In some embodiments, in charging (for example, in charging the battery from point 6 to point 4 or to point 4' in FIG. 3, or to other battery charge termination voltages, for example) constant current charging (constant current or CC) followed by constant voltage charging (constant current constant voltage, or CCCV) may be implemented. In some embodiments, in charging (for example, in charging the battery from point 6 to point 4 or to point 4' in FIG. 3, or to other battery charge termination voltages, for example) constant current charging followed by a rest time for cooling (CC plus rest time) may be implemented. In some embodiments, in charging (for example, in charging the battery from point 6 to point 4 or to point 4' in FIG. 3, or to other battery charge termination voltages, for example) constant current charging followed by constant voltage charging followed by a rest time for cooling (CCCV plus rest time) may be implemented. In some embodiments, for example, rest time can be dynamically added based on a monitoring of battery temperature (for example, monitoring of battery temperature by a controller such as controller 112). That is, rest time can be dynamically added during charging to allow the battery to cool down.

In some embodiments, the lower the battery charge level (battery charge termination voltage and/or remaining battery capacity), the better the expected battery longevity. This is because the lower charge level can correspond to lower battery level, which provides less damage to the battery. For example, in some embodiments, using a battery charge termination voltage at a point of around 60% remaining battery charge capacity rather than at a point of around 100% remaining battery charge capacity can provide better battery longevity. In some embodiments, a battery charge termination voltage is used so that a battery voltage point after supporting peak load (for example, a voltage at point 6) remains close to but above the system shutdown voltage (for example, system shutdown voltage $V_{min}$). In some embodiments, battery voltage is maintained at a voltage that is as low as possible while keeping the voltage level high enough to support peak load and stay above a system shutdown voltage during peak load support. In this manner, battery longevity can be extended while maintaining an ability to support peak load using the battery.

In some embodiments, peak load may last several seconds. In some embodiments, peak load may last tens of seconds. In some embodiments, peak load may last a length of time from several seconds to tens of seconds. In other embodiments, peak load may last different lengths of time. In some embodiments, the battery is discharged quickly (for example, during peak load), but in some embodiments the battery is not discharged as quickly.

In some embodiments, battery impedance may depend on one or more factors, including one or more of battery temperature, degradation, load, state of charge, duration, and/or other factors. In some embodiments, when the target charge voltage is calculated based on the impedance (and/or the increase in impedance), the impedance calculation can consider one or more of these factors (for example, one or more of battery temperature, degradation, load, state of charge, duration, and/or other factors). In some embodiments, impedance may be sensed by sensing the voltage change (for example, the voltage drop) and/or sensing the current to the load (for example, using controller 112 to sense the voltage change and/or the current to the load using current sensor 114) and then calculating the impedance based on these factors. That is, in some embodiments, the impedance may be sensed directly, and in some embodiments, the impedance may be calculated by other sensed factors (for example, sensed voltage change and/or sensed current).

In some embodiments, techniques described herein can be implemented in a system, memory space of a system, in a controller, in a memory space of a controller in a data center system, and/or in a battery pack, for example. In some embodiments, techniques described herein can be implemented in a remote system that is remote from the system load. Such a remote system can send charge voltage control to the data center to charge the battery accordingly. The remote system could be in a host that is on-site, or in any remote location. In some embodiments, techniques described herein can be implemented based on information from a remote integrated circuit (IC), a battery pack and/or from an IC of a battery pack (for example, in a fuel gauging IC). For example, in some embodiments, when impedance is calculated, the information used to calculate the impedance (for example, voltage change information and/or current information) can be provided from a remote IC, a battery pack and/or from an IC of a battery pack (for example, in a fuel gauging IC).

In some embodiments, techniques described herein (and/or implemented by a controller described herein) may be implemented by a firmware embedded solution, an FPGA, a DSP, a discrete ASIC, and/or a processor, etc.

In some embodiments, a system (for example, system 100 and/or system load 104) can be one or more of a computing system, a stationary system, a data center system, a server, a car, a robot, a medical device, and/or a system supporting peak energy use of one or more building such as an office building, an industrial building, a home, an apartment building, etc. In some embodiments, the system can be any system with spare battery capacity (for example, battery capacity that is temporarily spare).

In some embodiments, impedance can include an ohmic portion (for example, impedance for a short duration) and/or a polarization portion (for example, impedance for a long duration).

Implementations using one battery are shown and described herein in some embodiments. However, in some embodiments, a battery as used herein can include one battery, multiple batteries connected in parallel, multiple batteries connected in series, one or more 1S battery, one or more 2S battery, one or more other multi-S battery, etc. In some embodiments, a battery as used herein can be a lithium ion battery with $LiCoO_2$ cathode and graphic anode. In some embodiments, a battery as used herein is applicable to other chemistries.

Some embodiments relate to battery charge termination voltage adjustment. In some embodiments, a first operation includes lowering battery charge termination voltage to a level where the battery has enough capacity to support peak load. In some embodiments, a second operation includes, after the battery ages and/or battery impedance increases, slightly increasing the battery charge termination voltage so that the battery keeps enough capacity to support peak load (for example, in view of the aging battery and/or battery impedance increase). In some embodiments, a third operation includes repeating (for example, periodically repeating) the second operation of slightly increasing the battery charge termination voltage (for example, until the battery charge termination voltage reaches a safety threshold such as, for example, a safety threshold where the remaining battery capacity is approximately 100%).

Some embodiments relate to battery charge termination voltage adjustment. In some embodiments, a first operation includes lowering battery charge termination voltage to a level where the battery has enough capacity to support peak load, such as, for example, point 4 in FIG. 3. It is noted that point 4 in FIG. 3 can be the point where battery voltage after supporting peak load (for example, the voltage at point 6 in FIG. 3) is above a system shutdown voltage (for example, is above system shutdown voltage $V_{min}$ in FIG. 3). In some embodiments, a second operation includes, after the battery ages and/or battery impedance increases (for example, the voltage change or voltage drop dV from point 4 to point 5 and point 6 of FIG. 3 nears the system shutdown voltage $V_{min}$ of FIG. 3), slightly increasing the battery charge termination voltage (for example, from the voltage where open circuit voltage is at point 4 to the voltage where open circuit voltage is at point 4' of FIG. 3) so that the battery keeps enough capacity to support peak load (for example, to avoid hitting the system shutdown voltage $V_{min}$ of FIG. 3 under peak load). In some embodiments, a third operation includes repeating (for example, periodically repeating) the second operation of slightly increasing the battery charge termination voltage (for example, until the battery charge termination voltage reaches a safety threshold such as, for example, a safety threshold where the remaining battery capacity is approximately 100% such as at point 1 of FIG. 3).

Figure 4:
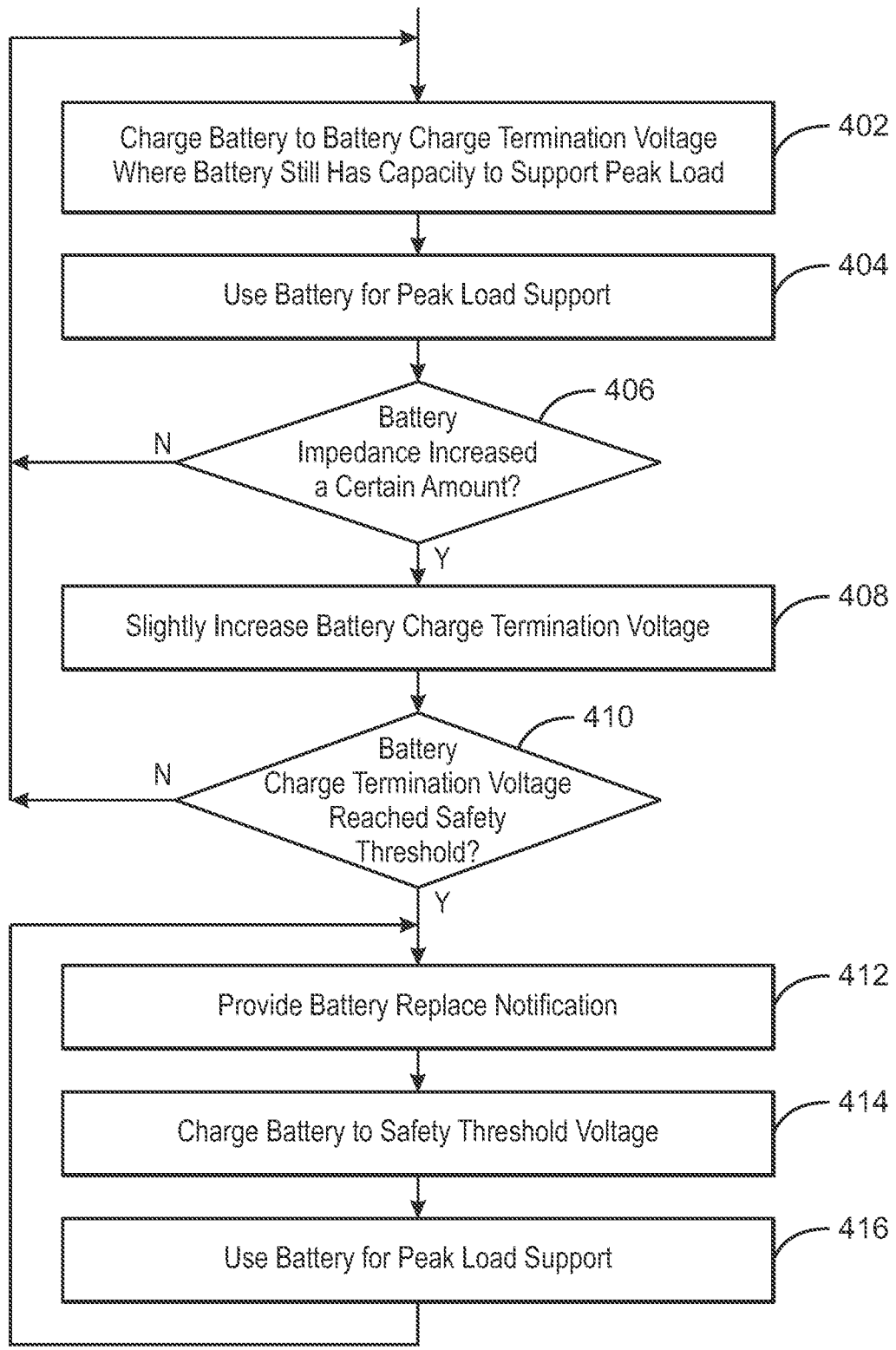
FIG. 4 illustrates battery charge termination voltage adjustment in accordance with some embodiments.

FIG. 4 illustrates a flow diagram 400 that can relate to battery charge termination voltage adjustment according to some embodiments. The operations of flow diagram 400 may be performed by a control unit or a controller (for example, such as controller 112 and/or other units). In some embodiments, the control unit or controller implementing flow 400 may include one or more processors, monitoring logic, control logic, software, firmware, agents, controllers, and/or other modules. In some embodiments, flow 400 can include additional operations and/or does not include all operations illustrated and/or described herein.

At operation 402, a battery is charged to a charge termination voltage where the battery still has the capacity to support peak load. In some embodiments, for example, operation 402 can charge the battery to a battery charge termination voltage level that just supports peak load of the system in a manner that the voltage comes close to the system shutdown voltage after supporting peak load. In some embodiments, at the first time through operation 402, the battery is charged to a low level battery charge termination voltage where the battery still has the capacity to support peak load. In some embodiments, for example, at each iteration, operation 402 can charge the battery to an initial battery charge termination voltage level that just supports peak load of the system in a manner that the voltage comes close to the system shutdown voltage after supporting peak load. In some embodiments, in some later iterations of operation 402, if applicable, after peak load support, operation 402 can charge the battery to a slightly increased battery charge termination voltage that is increased from the initially low level.

In some embodiments, for example, operation 402 can charge the battery to an initial low battery charge termination voltage such as a voltage at which a remaining battery capacity is around 60%, per example. In some embodiments, for example, operation 402 can charge the battery to an initial low voltage such as the voltage at point 4 in FIG. 3, for example. In some embodiments, after peak load support, operation 402 can charge the battery to other slightly increased voltages such as the voltage at point 4' in FIG. 3, and other slightly increased voltages after point 4' in FIG. 3, for example. In some embodiments, after an end of battery discharge voltage after supporting peak load, when the voltage comes close to the system shutdown voltage, battery charge termination voltage is slightly increased so that the battery discharge voltage after subsequently supporting peak load will still remain above the system shutdown voltage.

At operation 404, after the battery has been charged to the battery charge termination voltage where the battery still has capacity to support peak load, the battery may be used for peak load support. At operation 406, after the battery has been used to support peak load, a determination may be made as to whether the battery impedance (for example, the internal battery impedance) has increased a certain amount that is enough to trigger an increase in the battery charge termination voltage. Since an increase in battery impedance will create a higher voltage change (for example, voltage drop) of the battery during use of the battery (for example, during peak load support), the battery may come too close to system shutdown voltage during use, and an increase in battery charge termination voltage may be necessary to ensure that the voltage does not hit the system shutdown voltage during peak load support, for example.

If the battery impedance has not increased the determined amount at operation 406, flow returns to operation 402 to charge the battery to the battery same charge termination voltage (for example, after peak load has been supported, or the voltage has otherwise changed or dropped below the proper level). If the battery impedance has increased that amount at operation 406, flow can move to operation 408, where the battery charge termination voltage is slightly increased (for example, by a small amount such as around 0.1 volts or so, for example, and/or is slightly increased from point 4 in FIG. 3 to point 4' in FIG. 3, or from point 4' in FIG. 3 to a point on line 302 with a corresponding voltage that is slightly higher than the voltage corresponding to that at point 4', for example).

At operation 410, after the battery charge termination voltage has been slightly increased at operation 408, a determination is made as to whether the battery charge termination voltage has reached a safety threshold (for example, has reached a 100% battery charge level, and/or has reached a voltage corresponding to the voltage at point 1 in FIG. 2 or the voltage at point 1 in FIG. 3). If the battery charge termination voltage has not reached the safety voltage at operation 410, flow returns to operation 402, where the battery is charged to the current battery charge termination voltage. If the battery charge termination voltage has reached the safety voltage at operation 410, flow moves to operation 412, where a battery replace notification is provided to indicate that the battery should be changed, for example. At operation 414 the battery is charged to a battery charge termination voltage equal to the safety threshold voltage. Then, at operation 416, after the battery has been charged to the battery charge termination voltage equal to the safety threshold voltage, the battery may be used for peak load support. Then flow returns to operation 412. In this manner, the battery replace notification can be provided at 412, the battery can be charged to the safety threshold voltage at 414, and the battery can be used for peak load support at 416 until the battery is replaced. Once the battery is replaced, flow 400 can begin again at an initial operation of operation 402 (for example, where the new battery is charged at an initial low level battery charge termination voltage where the battery still has capacity to support peak load.

In some embodiments, when the battery charge termination voltage reaches the safety threshold at operation 410, the battery may be close to a dead battery condition. Therefore, in some embodiments, the system (for example, system 100 and/or controller 112) can communicate with a management system (for example, with a data center management system). In some embodiments, the management system can send a robot or a human to come out and to replace the battery (for example, to replace battery 106).

It is noted that many other implementations of flow 400 may be made in accordance with some embodiments. For example, in some embodiments, a battery replace notification may be made before the charge termination voltage reaches the safety threshold. For example, in some embodiments, the battery replace notification may be made at a certain charge termination voltage less than the safety threshold (for example, 0.1 volts lower than the safety threshold, or at some other battery charge termination voltage level). In some embodiments, for example, instead of determining whether battery impedance has increased a certain amount at operation 406, other operations may be performed. For example, an age of the battery determination may be used at operation 406 in accordance with some embodiments.

Figure 5:
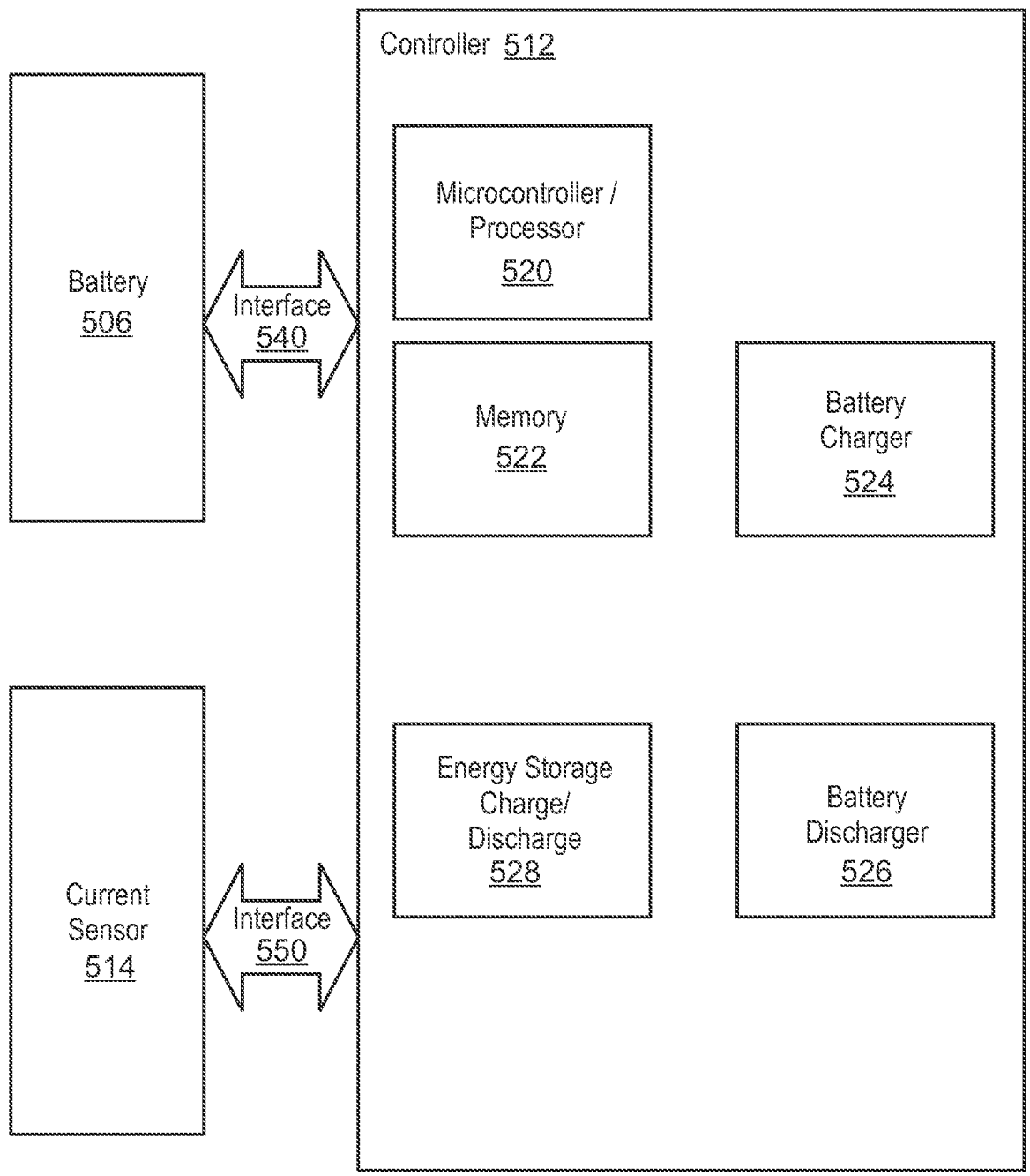
FIG. 5 illustrates a system in accordance with some embodiments.

FIG. 5 illustrates a system 500 in accordance with some embodiments. In some embodiments, system 500 includes a battery 506, a controller 512, and a current sensor 514. In some embodiments, battery 506 is the same as or similar to battery 106. In some embodiments, controller 512 is the same as or similar to controller 112. In some embodiments, current sensor 514 is the same as or similar to current sensor 114. In some embodiments, controller 512 is a battery controller. In some embodiments, controller 512 is one or more of an application specific integrated circuit (ASIC), a digital signal processor (DSP), a field programmable gate array (FPGA), a processor, etc. including some of all of the functional blocks in FIG. 5 In some embodiments, all or part of controller 512 is implemented in software as stored on a memory (for example, memory 522) and executed by, for example, a processor or microcontroller (for example, microcontroller/processor 520). In some embodiments, controller 512 can be, for example, a control integrated circuit (IC). In some embodiments, controller 512 can be part of a power management integrated circuit (PMIC). In some embodiments, controller 512 can be part of a fuel gauge. In some embodiments, controller 512 can be part of a battery management system.

Controller 512 interfaces with battery 506 using an interface 540. Interface 540 can include a physical interface for supplying power and ground. In some embodiments, interface 540 includes a data interface.

Controller 512 interfaces with current sensor 514 using an interface 550. Interface 550 can include a physical interface for supplying power and ground. In some embodiments, interface 550 includes a data interface.

In some embodiments, controller 512 includes a processor or microcontroller 520, a memory 522, battery charger 524, battery discharger 526, and/or energy storage charge/discharge 528 (for example, included in battery power supplemental logic). In some embodiments, battery power supplemental logic included in controller 512 can determine whether the power provided by the battery of the power supply system is to be supplemented or not from energy storage. In some embodiments, battery power supplemental logic included in controller 512 can include a voltage supplemental module that can determine whether to supplement the power provided by the battery based on, for example, the voltage currently being provided to the system load. This may be based on voltage monitoring hardware that provides voltage measurements to voltage supplemental module. In some embodiments, if the voltage droops below a threshold, or other predetermined level, yet is above the voltage minimum of the system, then voltage supplemental module can trigger and control the power supply system to have the power provided by the battery to be supplemented by power form the energy storage. This control may include turning on/off switches in the power delivery system to enable power to flow to the system load or to energy storage, and/or to protect other components in the system, to decouple the system load from the battery, etc.

In some embodiments, battery power supplemental logic in controller 512 includes an energy storage charge and discharge module 528 that can control components in a hybrid power boost charging system such as, for example, system 100 to cause the energy storage to be charged at times and to be discharged and/or disabled at other times.

Controller 512 can also include mode selection logic that determines when to enter a particular mode, such as, for example, a charging mode or a discharging mode.

While not shown in FIG. 5, controller 512 can include analog-to-digital converters (ADCs), filters, and a digital amplifier. One or more of the ADCs, filters, and digital amplifier may be, for example, an ASIC, a DSP, an FPGA, a processor, etc. These elements may be used to convert and analog measurement (for example, battery current and voltage) to a digital value for use in the battery charging control process. The digital amplifier may be a differential amplifier that generates an analog signal based on the voltage change (for example, voltage drop) across the battery (for example, the difference in voltage values between the positive and negative terminal of the battery), which is then converted to a filtered digital value using the ADC and the filter.

In some embodiments, controller 512 includes a battery charger 524 to charge the battery using current charge from a power supply.

In some embodiments, a critical voltage level of the system voltages when the protection is activated can be adjusted by the system Embedded Controller, the Fuel Gauge, or the SoC. The adjustment can be made based on the battery state of charge, peak power projections of the SoC or the rest of the platform, system impedance, or changes in system input decoupling, minimum system voltage, etc.

In some embodiments, controller 512 can implement any of the techniques described herein. In some embodiments, controller 512 can control peak power support and/or battery charge termination voltage adjustment. For example, in some embodiments, controller 512 can implement the flow 400 of FIG. 4.

Figure 6:
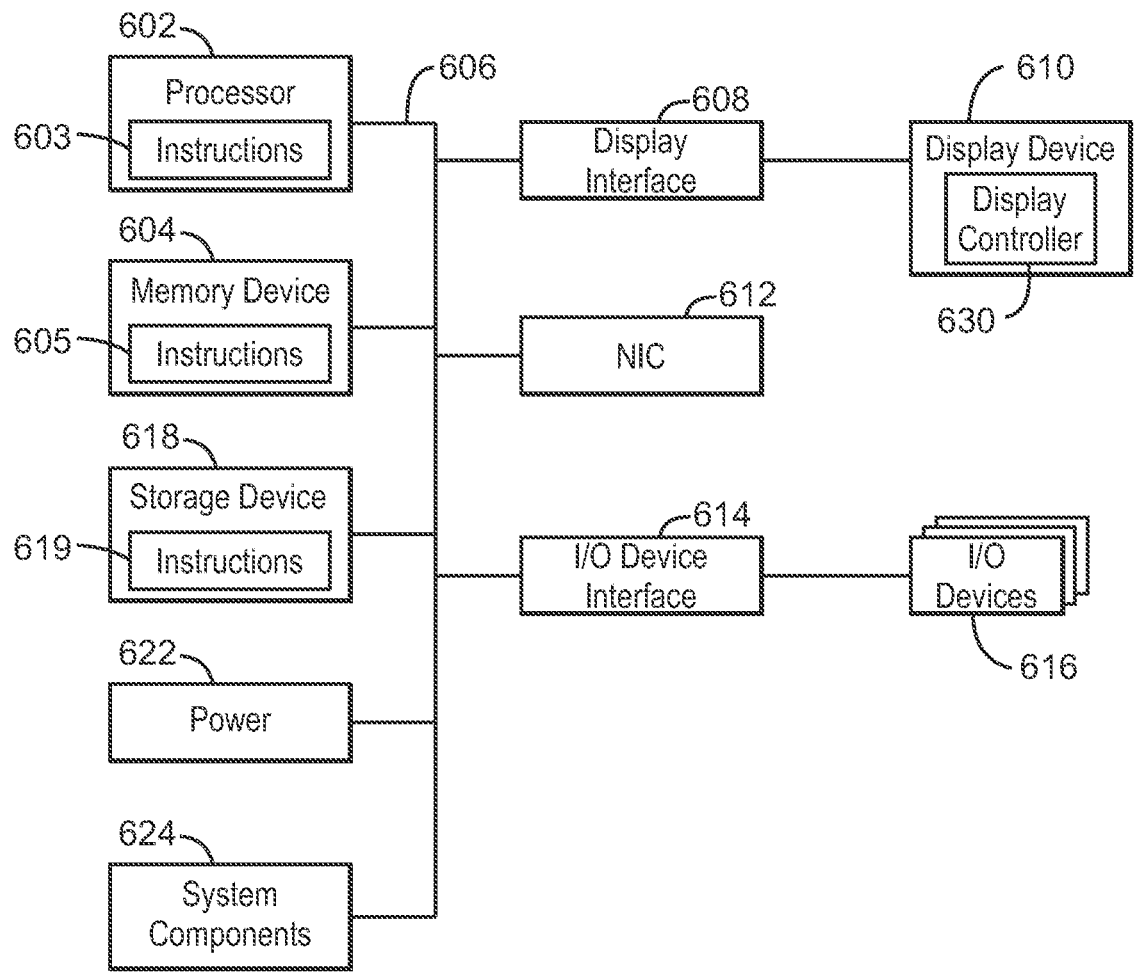
FIG. 6 illustrates a computing system in accordance with some embodiments.

FIG. 6 is a block diagram of an example of a computing device 600 in accordance with some embodiments. In some embodiments, computing device 600 may be a computing device including one or more elements of system 100. For example, in some embodiments, computing device 600 can implement any of the techniques described herein. In some embodiments, one or more elements of computing device 600 can be included in controller 112, etc. In some embodiments, computing device 600 can implement flow 400. In some embodiments, computing device 600 may provide any techniques or functions illustrated and/or described herein.

In some embodiments, functions of computing device 600 can include, for example, battery charge termination voltage adjustment, and/or any other techniques described and/or illustrated herein, etc., according to some embodiments. In some embodiments, any portion of the flow, circuits or systems illustrated in any one or more of the figures, and any of the embodiments described herein can be included in or be implemented by computing device 600. The computing device 600 may be, for example, a computing device, a controller, a control unit, an application specific controller, and/or an embedded controller, among others.

The computing device 600 may include a processor 602 that is adapted to execute stored instructions (for example, instructions 603), as well as a memory device 604 (or storage 604) that stores instructions 605 that are executable by the processor 602. The processor 602 can be a single core processor, a multi-core processor, a computing cluster, or any number of other configurations. For example, processor 602 can be an Intel® processor such as an Intel® Celeron, Pentium, Core, Core i3, Core i5, or Core i7 processor. In some embodiments, processor 602 can be an Intel® x86 based processor. In some embodiments, processor 602 can be an ARM based processor. The memory device 604 can be a memory device or a storage device, and can include volatile storage, non-volatile storage, random access memory, read only memory, flash memory, or any other suitable memory or storage systems. The instructions that are executed by the processor 602 may also be used to implement hybrid power boost charging and/or discharging, battery charge termination voltage adjustment, etc. as described in this specification. In some embodiments, processor 602 may include the same or similar features or functionality as, for example, various controllers or agents in this disclosure.

The processor 602 may also be linked through the system interconnect 606 (e.g., PCI®, PCI-Express®, NuBus, etc.) to a display interface 608 adapted to connect the computing device 600 to a display device 610. The display device 610 may include a display controller 630. Display device 610 may also include a display screen that is a built-in component of the computing device 600. The display device may also include a computer monitor, television, or projector, among others, that is externally connected to the computing device 600. In some embodiments, computing device 600 does not include a display interface or a display device.

In some embodiments, the display interface 608 can include any suitable graphics processing unit, transmitter, port, physical interconnect, and the like. In some examples, the display interface 608 can implement any suitable protocol for transmitting data to the display device 610. For example, the display interface 608 can transmit data using a high-definition multimedia interface (HDMI) protocol, a DisplayPort protocol, or some other protocol or communication link, and the like In addition, a network interface controller (also referred to herein as a NIC) 612 may be adapted to connect the computing device 600 through the system interconnect 606 to a network (not depicted). The network (not depicted) may be a cellular network, a radio network, a wide area network (WAN), a local area network (LAN), or the Internet, among others.

The processor 602 may be connected through system interconnect 606 to an input/output (I/O) device interface 614 adapted to connect the computing host device 600 to one or more I/O devices 616. The I/O devices 616 may include, for example, a keyboard or a pointing device, where the pointing device may include a touchpad or a touchscreen, among others. The I/O devices 616 may be built-in components of the computing device 600, or may be devices that are externally connected to the computing device 600.

In some embodiments, the processor 602 may also be linked through the system interconnect 606 to a storage device 618 that can include a hard drive, a solid-state drive (SSD), a magnetic drive, an optical drive, a USB flash drive, an array of drives, or any other type of storage, including combinations thereof. In some embodiments, the storage device 618 can include any suitable applications that can be used by processor 602 to implement any of the techniques described herein. In some embodiments, storage 618 stores instructions 619 that are executable by the processor 602. In some embodiments, the storage device 618 can include a basic input/output system (BIOS).

In some embodiments, a power device 622 is provided. For example, in some embodiments, power device 622 can provide peak power support, battery charge termination voltage adjustment, charging, power, power supply, power delivery, power management, peak power management, under-voltage protection, power control, voltage regulation, power generation, voltage generation, power protection, and/or voltage protection, etc. Power 622 can also include any of the battery voltage adjustment described herein. In some embodiments, power 622 can include one or more sources of power supply such as one or more power supply units (PSUs). In some embodiments, power 622 can be a part of system 600, and in some embodiments, power 622 can be external to the rest of system 600. In some embodiments, power 622 can provide any of peak power supply support, battery charge termination voltage adjustment, charging, discharging, power, power supply, power delivery, power management, peak power management, under-voltage protection, power control, voltage regulation, power generation, voltage generation, power protection, or voltage protection, power control, power adjustment, or any other techniques such as those described herein. For example, in some embodiments, power 622 can provide any of the techniques as described in reference to or illustrated in any of the drawings herein.

FIG. 6 also illustrates system components 624. In some embodiments, system components 624 can include any of display, camera, audio, storage, modem, or memory components, or any additional system components. In some embodiments, system components 624 can include any system components for which power, voltage, power management, etc. can be implemented according to some embodiments as described herein.

It is to be understood that the block diagram of FIG. 6 is not intended to indicate that the computing device 600 is to include all of the components shown in FIG. 6 in all embodiments. Rather, the computing device 600 can include fewer or additional components not illustrated in FIG. 6 (e.g., additional memory components, embedded controllers, additional modules, additional network interfaces, etc.). Furthermore, any of the functionalities of power device 622 may be partially, or entirely, implemented in hardware or in a processor such as processor 602. For example, the functionality may be implemented with an application specific integrated circuit, logic implemented in an embedded controller, or in logic implemented in the processor 602, among others. In some embodiments, the functionalities of power device 622 can be implemented with logic, wherein the logic, as referred to herein, can include any suitable hardware (e.g., a processor, among others), software (e.g., an application, among others), firmware, or any suitable combination of hardware, software, or firmware. In some embodiments, power device 622 can be implemented with an integrated circuit.

Figure 7:
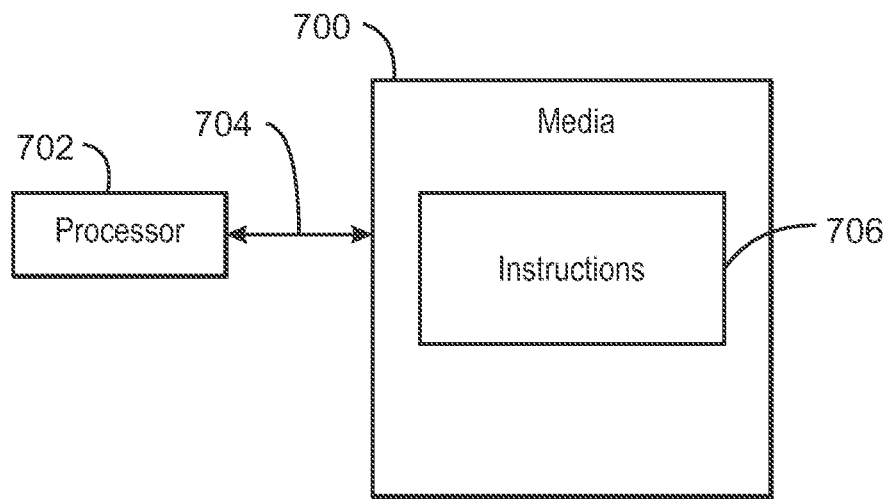
FIG. 7 illustrates one or more processors and one or more media in accordance with some embodiments.

FIG. 7 is a block diagram of an example of one or more processors 702 and one or more tangible, non-transitory computer readable media 700 for peak power supply support, battery charger termination voltage adjustment, etc. The one or more tangible, non-transitory, computer-readable media 700 may be accessed by the processor(s) 702 over a computer interconnect 704. Furthermore, the one or more tangible, non-transitory, computer-readable media 700 may include instructions (or code) 706 to direct the processor(s)

702 to perform operations as described herein. In some embodiments, processor 702 is one or more processors. In some embodiments, processor(s) 702 can perform some or all of the same or similar functions that can be performed by other elements described herein using instructions (code) 706 included on media 700 (for example, some or all of the functions or techniques illustrated in or described in reference to any of FIGS. 1-6). In some embodiments, one or more of processor(s) 702 may include the same or similar features or functionality as, for example, various controllers, units, or agents, etc. described in this disclosure. In some embodiments, one or more processor(s) 702, interconnect 704, and/or media 700 may be included in computing device 600.

Various components discussed in this specification may be implemented using software components. These software components may be stored on the one or more tangible, non-transitory, computer-readable media 700, as indicated in FIG. 7. For example, peak power support and/or battery charge termination voltage adjustment, etc. may be adapted to direct the processor(s) 702 to perform one or more of any of the operations described in this specification and/or in reference to the drawings.

It is to be understood that any suitable number of software components may be included within the one or more tangible, non-transitory computer-readable media 700. Furthermore, any number of additional software components shown or not shown in FIG. 7 may be included within the one or more tangible, non-transitory, computer-readable media 700, depending on the specific application.

The various techniques and/or operations described herein (for example, in reference to any one or more of FIGS. 1-7) may be performed by a control unit comprised of one or more processors, monitoring logic, control logic, software, firmware, agents, controllers, logical software agents, system agents, and/or other modules. For example, in some embodiments, some or all of the techniques and/or operations described herein may be implemented by a system agent. Due to the variety of modules and their configurations that may be used to perform these functions, and their distribution through the system and/or in a different system, they are not all specifically illustrated in their possible locations in the figures.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Example 1 In some examples, a control unit is configured to adjust charge termination voltage of a rechargeable energy storage device (for example, to adjust charge termination voltage of a battery). The control unit is adapted to charge the rechargeable energy storage device to a charge termination voltage where the rechargeable energy storage device has capacity to support peak load but comes close to a system shutdown voltage after supporting peak load, and to increase the charge termination voltage if a voltage of the rechargeable energy storage device is near a system shutdown voltage after supporting peak load.

Example 2 includes the subject matter of example 1. The control unit is adapted to increase the charge termination voltage based on impedance of the rechargeable energy storage device.

Example 3 includes the subject matter of any of examples 1-2. The control unit is adapted to monitor the impedance of the rechargeable energy storage device.

Example 4 includes the subject matter of any of examples 1-3. The control unit is adapted to calculate the impedance of the rechargeable energy storage device based on monitored conditions.

Example 5 includes the subject matter of any of examples 1-4. Monitored conditions include a voltage change of the rechargeable energy storage device and a sensed current.

Example 6 includes the subject matter of any of examples 1-5. The control unit is adapted to increase the charge termination voltage a predetermined amount if the voltage of the rechargeable energy storage device is near the system shutdown voltage after supporting peak load.

Example 7 includes the subject matter of any of examples 1-6. The control unit is adapted to continue to increase the charge termination voltage each time the voltage of the rechargeable energy storage device is near a system shutdown voltage after supporting peak load.

Example 8 includes the subject matter of any of examples 1-7. The control unit is adapted to determine if the charge termination voltage has reached a safety threshold voltage.

Example 9 includes the subject matter of any of examples 1-8. The control unit is adapted to provide a rechargeable energy storage device replacement needed notification if the charge termination voltage has reached the safety threshold voltage.

Example 10 includes the subject matter of any of examples 1-9. The control unit is adapted to charge the rechargeable energy storage device to the safety threshold voltage if the charge termination voltage has reached the safety threshold voltage.

Example 11 In some examples, a method can adjust charge termination voltage of a rechargeable energy storage device. The method can include charging the rechargeable energy storage device to a charge termination voltage where the rechargeable energy storage device has capacity to support peak load but comes close to a system shutdown voltage after supporting peak load, and increasing the charge termination voltage if a voltage of the rechargeable energy storage device is near a system shutdown voltage after supporting peak load.

Example 12 includes the subject matter of example 11. The method includes increasing the charge termination voltage based on impedance of the rechargeable energy storage device.

Example 13 includes the subject matter of any of examples 11-12. The method includes monitoring the impedance of the rechargeable energy storage device.

Example 14 includes the subject matter of any of examples 11-13. The method includes calculating the impedance of the rechargeable energy storage device based on monitored conditions.

Example 15 includes the subject matter of any of examples 11-14. Monitored conditions include a voltage change of the rechargeable energy storage device and a sensed current.

Example 16 includes the subject matter of any of examples 11-15. The method includes increasing the charge termination voltage a predetermined amount if the voltage of the rechargeable energy storage device is near the system shutdown voltage after supporting peak load.

Example 17 includes the subject matter of any of examples 11-16. The method includes continuing to increase the charge termination voltage each time the voltage of the rechargeable energy storage device is near a system shutdown voltage after supporting peak load.

Example 18 includes the subject matter of any of examples 11-17. The method includes determining if the charge termination voltage has reached a safety threshold voltage.

Example 19 includes the subject matter of any of examples 11-18. The method includes providing a rechargeable energy storage device replacement needed notification if the charge termination voltage has reached the safety threshold voltage.

Example 20 includes the subject matter of any of examples 11-19. The method includes charging the rechargeable energy storage device to the safety threshold voltage if the charge termination voltage has reached the safety threshold voltage.

Example 21 In some examples, one or more tangible, non-transitory machine readable media includes a plurality of instructions that, in response to being executed on at least one processor, cause the at least one processor to charge the rechargeable energy storage device to a charge termination voltage where the rechargeable energy storage device has capacity to support peak load but comes close to a system shutdown voltage after supporting peak load, and to increase the charge termination voltage if a voltage of the rechargeable energy storage device is near a system shutdown voltage after supporting peak load.

Example 22 includes the subject matter of example 21. The method one or more tangible, non-transitory machine readable media includes a plurality of instructions that, in response to being executed on at least one processor, cause the at least one processor to increase the charge termination voltage based on impedance of the rechargeable energy storage device.

Example 23 includes the subject matter of any of examples 21-22. The one or more tangible, non-transitory machine readable media include a plurality of instructions that, in response to being executed on at least one processor, cause the at least one processor to monitor the impedance of the rechargeable energy storage device.

Example 24 includes the subject matter of any of examples 21-23. The one or more tangible, non-transitory machine readable media include a plurality of instructions that, in response to being executed on at least one processor, cause the at least one processor to calculate the impedance of the rechargeable energy storage device based on monitored conditions.

Example 25 includes the subject matter of any of examples 21-24. Monitored conditions include a voltage change of the rechargeable energy storage device and a sensed current.

Example 26 includes the subject matter of any of examples 21-25. The one or more tangible, non-transitory machine readable media include a plurality of instructions that, in response to being executed on at least one processor, cause the at least one processor to increase the charge termination voltage a predetermined amount if the voltage of the rechargeable energy storage device is near the system shutdown voltage after supporting peak load.

Example 27 includes the subject matter of any of examples 21-26. The one or more tangible, non-transitory machine readable media include a plurality of instructions that, in response to being executed on at least one processor, cause the at least one processor to continue to increase the charge termination voltage each time the voltage of the rechargeable energy storage device is near a system shutdown voltage after supporting peak load.

Example 28 includes the subject matter of any of examples 21-27. The one or more tangible, non-transitory machine readable media include a plurality of instructions that, in response to being executed on at least one processor, cause the at least one processor to determine if the charge termination voltage has reached a safety threshold voltage.

Example 29 includes the subject matter of any of examples 21-28. The one or more tangible, non-transitory machine readable media include a plurality of instructions that, in response to being executed on at least one processor, cause the at least one processor to provide a rechargeable energy storage device replacement needed notification if the charge termination voltage has reached the safety threshold voltage.

Example 30 includes the subject matter of any of examples 21-29. The one or more tangible, non-transitory machine readable media include a plurality of instructions that, in response to being executed on at least one processor, cause the at least one processor to charge the rechargeable energy storage device to the safety threshold voltage if the charge termination voltage has reached the safety threshold voltage.

Example 31 In some examples, a controller is configured to adjust charge termination voltage of a rechargeable energy storage device. The controller comprising includes means for charging the rechargeable energy storage device to a charge termination voltage where the rechargeable energy storage device has capacity to support peak load but comes close to a system shutdown voltage after supporting peak load, and means for increasing the charge termination voltage if a voltage of the rechargeable energy storage device is near a system shutdown voltage after supporting peak load.

Example 32 includes the subject matter of example 31. The controller includes means for increasing the charge termination voltage based on impedance of the rechargeable energy storage device.

Example 33 includes the subject matter of any of examples 31-32. The controller includes means for monitoring the impedance of the rechargeable energy storage device.

Example 34 includes the subject matter of any of examples 31-33. The controller includes means for calculating the impedance of the rechargeable energy storage device based on monitored conditions.

Example 35 includes the subject matter of any of examples 31-34. Monitored conditions include a voltage change of the rechargeable energy storage device and a sensed current.

Example 36 includes the subject matter of any of examples 31-35. The controller includes means for increasing the charge termination voltage a predetermined amount if the voltage of the rechargeable energy storage device is near the system shutdown voltage after supporting peak load.

Example 37 includes the subject matter of any of examples 31-36. The controller includes means for continuing to increase the charge termination voltage each time the voltage of the rechargeable energy storage device is near a system shutdown voltage after supporting peak load.

Example 38 includes the subject matter of any of examples 31-37. The controller includes means for determining if the charge termination voltage has reached a safety threshold voltage.

Example 39 includes the subject matter of any of examples 31-38. The controller includes means for providing a rechargeable energy storage device replacement needed notification if the charge termination voltage has reached the safety threshold voltage.

Example 40 includes the subject matter of any of examples 31-39. The controller includes means for charging the rechargeable energy storage device to the safety threshold voltage if the charge termination voltage has reached the safety threshold voltage.

Example 41 In some examples, a system can adjust charge termination voltage of a rechargeable energy storage device. The system includes a charger adapted to charge a rechargeable energy storage device and a control unit. The control unit is adapted to send a control signal to the charger to charge the rechargeable energy storage device to a charge termination voltage where the rechargeable energy storage device has capacity to support peak load but comes close to a system shutdown voltage after supporting peak load. The control unit is also to increase the charge termination voltage if a voltage of the rechargeable energy storage device is near a system shutdown voltage after supporting peak load.

Example 42 includes the subject matter of example 41. The control unit is adapted to increase the charge termination voltage based on impedance of the rechargeable energy storage device.

Example 43 includes the subject matter of any of examples 41-42. The control unit is adapted to monitor the impedance of the rechargeable energy storage device.

Example 44 includes the subject matter of any of examples 41-43. The control unit is adapted to calculate the impedance of the rechargeable energy storage device based on monitored conditions.

Example 45 includes the subject matter of any of examples 41-44. Monitored conditions include a voltage change of the rechargeable energy storage device and a sensed current.

Example 46 includes the subject matter of any of examples 41-45. The system includes a current sensor adapted to sense current. The control unit is adapted to increase the charge termination voltage based on (or in response to) the sensed current.

Example 47 includes the subject matter of any of examples 41-46. The control unit is adapted to increase the charge termination voltage a predetermined amount if the voltage of the rechargeable energy storage device is near the system shutdown voltage after supporting peak load.

Example 48 includes the subject matter of any of examples 41-47. The control unit is adapted to continue to increase the charge termination voltage each time the voltage of the rechargeable energy storage device is near a system shutdown voltage after supporting peak load.

Example 49 includes the subject matter of any of examples 41-48. The control unit is adapted to determine if the charge termination voltage has reached a safety threshold voltage.

Example 50 includes the subject matter of any of examples 41-49. The control unit is adapted to provide a rechargeable energy storage device replacement needed notification if the charge termination voltage has reached the safety threshold voltage.

Example 51 includes the subject matter of any of examples 41-50. The control unit is adapted to charge the rechargeable energy storage device to the safety threshold voltage if the charge termination voltage has reached the safety threshold voltage.

Example 52 In some examples, a control unit is configured to adjust charge termination voltage of a rechargeable energy storage device, including means to perform a method as in any other example.

Example 53 In some examples, machine-readable storage includes machine-readable instructions, when executed, to implement a method or realize an apparatus as in any other example.

Example 54 In some examples, one or more machine readable medium include(s) code, when executed, to cause a machine to perform the method of any other example.

Example 55 In some examples, an apparatus includes means to perform a method as in any other example.

Example 56 In some examples, an apparatus includes a control unit. The apparatus includes means to perform a method as in any other example.

Although example embodiments and examples of the disclosed subject matter are described with reference to circuit diagrams, flow diagrams, block diagrams etc. in the drawings, persons of ordinary skill in the art will readily appreciate that many other ways of implementing the disclosed subject matter may alternatively be used. For example, the arrangements of the elements in the diagrams, or the order of execution of the blocks in the diagrams may be changed, or some of the circuit elements in circuit diagrams, and blocks in block/flow diagrams described may be changed, eliminated, or combined. Any elements as illustrated or described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, one or more volatile or non-volatile memory devices, such as storage devices or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile or non-volatile memory readable by the processor, at least one input device or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, or in a distributed environment, and with program code stored locally or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. An apparatus comprising:
a battery; and
a control circuitry coupled to the battery, wherein the control circuitry is configured to:
modify a charge termination voltage of the battery based on a comparison of a first threshold voltage of the apparatus to a voltage of the battery after supporting peak load of the apparatus; and
provide a notification to replace the battery based on the charge termination voltage of the battery reaching a second threshold voltage that is indicative of a safety level.

2. The apparatus of claim 1, wherein the control circuitry is further configured to allow, during peak load of the apparatus, the battery to provide power to the peak load along with power from a power supply unit separate from the battery.

3. The apparatus of claim 1, wherein the control circuitry is further configured to increase the charge termination voltage of the battery based on the comparison.

4. The apparatus of claim 1, wherein the control circuitry is further configured to lower an initial charge termination voltage of the battery below 100%.

5. The apparatus of claim 1, wherein the apparatus comprises a current sensor to sense a current through a load powered by the battery; and
wherein the control circuitry is further configured to identify the voltage of the battery after supporting peak load based on the sensed current.

6. The apparatus of claim 1, wherein the control circuitry is further configured to modify the charge termination voltage of the battery by a predetermined amount.

7. The apparatus of claim 1, wherein the control circuitry is further configured to modify the charge termination voltage of the battery by a dynamic amount.

8. The apparatus of claim 1, wherein the battery is a rechargeable battery.

9. The apparatus of claim 1, wherein the control circuitry is further configured to refrain from increasing the charge termination voltage if the battery reaches the second threshold voltage that is indicative of the safety level.

10. The apparatus of claim 1, wherein the first threshold voltage is a system shutdown voltage of the apparatus.

11. The apparatus of claim 1, wherein the control circuitry is to provide the notification to a user of the apparatus.

12. The apparatus of claim 1, wherein identification of the voltage of the battery after supporting peak load is based on identification of a change in an impedance of the battery.

13. A system comprising:
a power supply unit to power a system load;
a charger coupled to the power supply unit;
a battery coupled to the charger, wherein the battery is operable to provide power to the system load in addition to the power supply unit when the system is at peak load; and
a control circuitry coupled to the battery, wherein the control circuitry is configured to:
modify a charge termination voltage of the battery based on a comparison of a first threshold voltage of the system to a voltage of the battery after supporting peak load of the system; and
provide a notification to replace the battery based on the charge termination voltage of the battery reaching a second threshold voltage that is indicative of a safety level.

14. The system of claim 13, wherein the control circuitry is further configured to refrain from increasing the charge termination voltage if the battery reaches the second threshold voltage that is indicative of the safety level.

15. The system of claim 13, wherein the control circuitry is further configured to:
determine, based on the comparison, whether impedance of the battery increased; and
if the impedance of the battery increased, increase the charge termination voltage.

16. The system of claim 13, wherein the system load is a system load of an electric vehicle.

17. The system of claim 13, wherein the control circuitry is further configured to increase the charge termination voltage of the battery based on the comparison.

18. The system of claim 13, wherein the control circuitry is to lower an initial charge termination voltage of the battery below 100%.

19. A machine-readable storage media having machine-readable instructions stored thereon that when executed cause one or more processors of an electric vehicle to:
   modify a charge termination voltage of a battery based on a comparison of a first threshold voltage of the electric vehicle to a voltage of the battery after supporting peak load of the electric vehicle; and
   provide a notification of to replace the battery based on the charge termination voltage of the battery reaching a second threshold voltage that is indicative of a safety level.

20. The machine-readable storage media of claim 19, wherein the instructions are further to cause the one or more processors to refrain from increasing the charge termination voltage if the battery reaches the second threshold voltage that is indicative of the safety level.

\* \* \* \* \*

UNITED STATES PATENT AND TRADEMARK OFFICE
CERTIFICATE OF CORRECTION

Page 1 of 1

PATENT NO. : 11,728,665 B2
APPLICATION NO. : 17/232023
DATED : August 15, 2023
INVENTOR(S) : Naoki Matsumura et al.

It is certified that error appears in the above-identified patent and that said Letters Patent is hereby corrected as shown below:

In the Claims

Column 23
Line 11 "...a notification of to replace..." should read --...a notification to replace...--

Signed and Sealed this
Twenty-seventh Day of August, 2024

Katherine Kelly Vidal
*Director of the United States Patent and Trademark Office*